Dec. 31, 1957  J. FANNEN  2,817,877
INSIDE CURING RIM

Filed April 2, 1956  2 Sheets-Sheet 1

INVENTOR.
John Fannen
BY Webster & Webster
ATTYS.

Dec. 31, 1957 J. FANNEN 2,817,877
INSIDE CURING RIM
Filed April 2, 1956 2 Sheets-Sheet 2
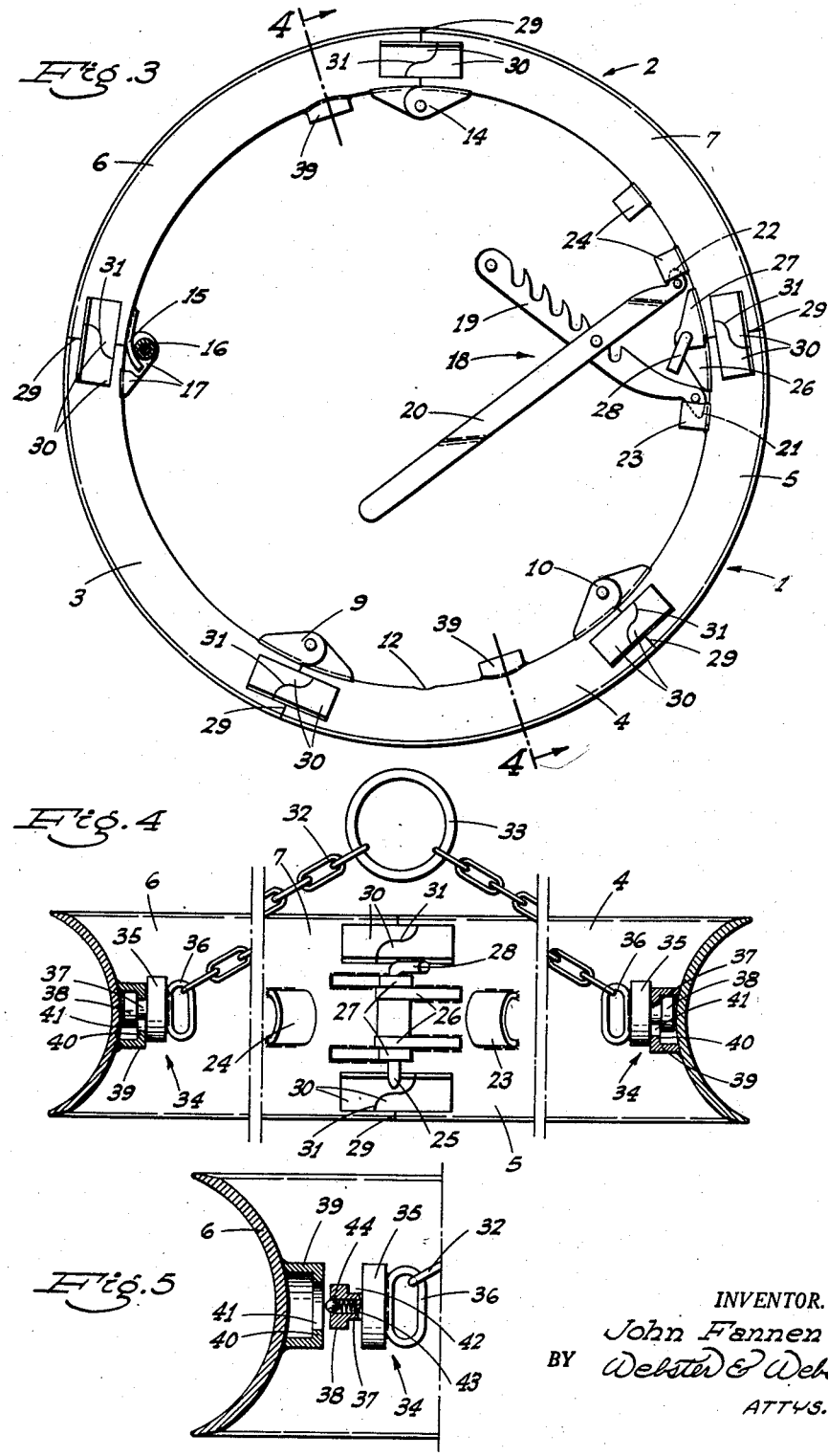
INVENTOR.
John Fannen
BY Webster & Webster
ATTYS.

United States Patent Office 2,817,877
Patented Dec. 31, 1957

2,817,877

INSIDE CURING RIM

John Fannen, Lodi, Calif., assignor to Super Mold Corporation of California, Lodi, Calif., a corporation of California Application April 2, 1956, Serial No. 575,459

1 Claim. (Cl. 18—18)

This invention relates in general to equipment used in the retreading of tires; the invention being directed in particular to—and it is a major object to provide—an improved inside curing rim.

In certain types of tire retreading molds the tire is maintained under pressure in the mold by an inflated, inside curing bag backed within the tire by an inside curing rim which completes the enclosure of such bag. As the inside curing rim is of a diameter greater than the bead-diameter of the tire, the rim is made sectional and foldable to permit of its insertion in, or removal from, the tire.

It is therefore another object of this invention to provide an inside curing rim, for the purpose described, which is of novel sectional and foldable construction, which facilitates the insertion or removal of the rim in or from the tire, respectively; said rim embodying two initially separate assemblies of rim sections each folded together at the start, and which assemblies are adapted for manipulation in a manner which simplifies the task of so inserting or removing the rim.

An additional object of the present invention is to provide an inside curing rim, as in the preceding paragraph, which includes novel detachable connections between the ends of those sections of the assemblies which abut when the latter are unfolded and disposed in place in a tire in backing relation to the inside curing bag.

A further object of the invention is to provide an inside curing rim in which one of said initially folded rim section assemblies is arranged so that one section thereof can be readily and properly positioned—by sight—for passage of the valve stem, of the inside curing bag, through a hole which exists in such one section for the purpose of receiving said stem.

Still another object of the invention is to provide an inside curing rim having novel couplings associated therewith for releasably attaching a lifting chain to the rim at opposed points therein, and which couplings are arranged to preclude their accidental release when the chain is slack, yet permitting of quick manual release when desired.

It is also an object of the invention to provide an inside curing rim designed for manufacture in an economical and facile manner.

A still further object of the invention is to provide a practical, reliable, and durable inside curing rim, and one which will be exceedingly effective for the purpose for which it is designed.

These objects are accomplished by means of such structure and relative arrangement of parts as will fully appear by a perusal of the following specification and claim.

In the drawings:

Fig. 3 is an elevation of the rim as fully assembled for use.

Fig. 4 is an enlarged diametral cross section on line 4—4 of Fig. 3; the view being foreshortened and showing particularly the releasable couplings for the lifting chain, and with such couplings engaged.

Fig. 5 is a similar but fragmentary view showing one of such couplings disengaged.

Figure 1:
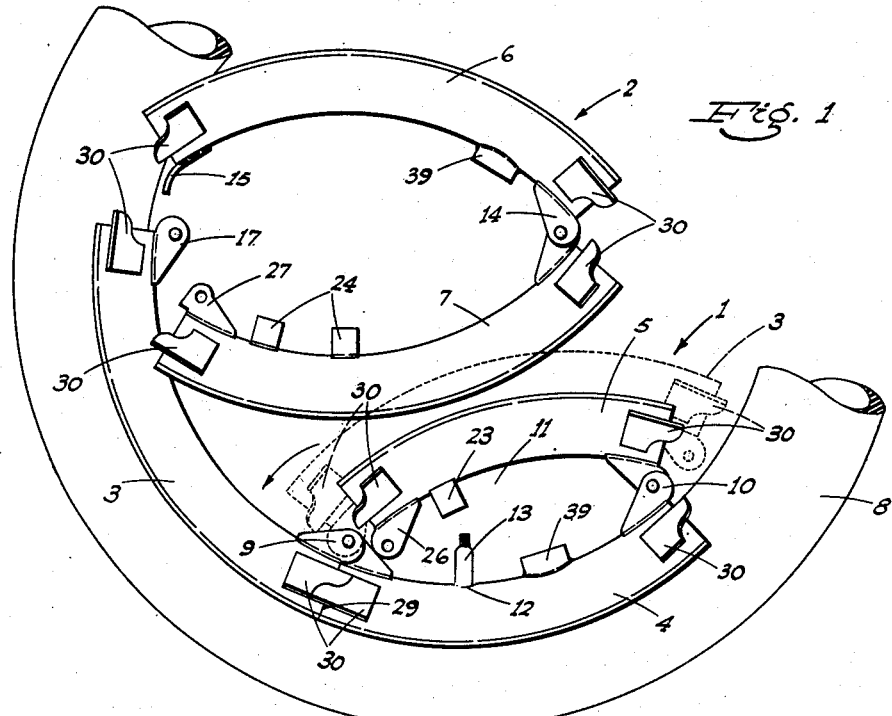
Fig. 1 is an elevation of the two initially separate rim section assemblies disposed in generally their initial positions relative to the inside curing bag; the three-part rim section assembly being shown with one of the sections unfolded, but whose folded position is also indicated in dotted lines.

Referring now more particularly to the drawings, and to the characters of reference marked thereon, the novel inside curing rim comprises a three-part rim section assembly, indicated generally at 1, and a two-part rim section assembly, indicated generally at 2. The three-part rim section assembly 1 comprises rim sections 3, 4, and 5, while the two-part rim section assembly 2 comprises rim sections 6 and 7. All of such rim sections are of predetermined arcuate extent lengthwise and are concavo-convex in cross section, and when abutted end to end—as will hereinafter appear—form a full-circle rim concave on the outside and adapted to seat in backing relation against an inside curing bag 8, shown in part in Fig. 1.

In use, the inside curing bag 8 is of course disposed within a tire, as is the rim, but the tire and the inside curing bag, except for the fragmentary showing of the latter in Fig. 1, are here omitted for the sake of clarity.

The rim sections 3 and 4, and the rim sections 4 and 5, are permanently hinged together at adjacent ends by inside hinges, indicated at 9 and 10, respectively.

In the initial or folded position of the three-part rim section assembly 1 the section 5 is folded over the section 4, and the section 3 is folded over the section 5. See Fig. 1 wherein the three-part rim section assembly 1 is shown so folded; the folded positions of the sections 4 and 5 being shown in full lines, and the folded position of section 3 in dotted lines.

When the three-part rim section assembly 1 is so folded a substantial space 11 extends between the sections 4 and 5, as shown in Fig. 1. The space 11 is of advantage in that it permits the operator to have a clear view of the hole 12 which is formed in the section 4 intermediate its ends for the reception of the valve stem 13 of the inside curing bag 8.

The sections 6 and 7 of the two-part rim section assembly 2 are connected together at adjacent ends by an inside hinge 14, whereby said assembly may be disposed in an initial or folded position, as shown in Fig. 1.

At the outset, the operator picks up the three-part rim section assembly 1 and inserts it into the tire in which the inside curing bag 8 has first been placed; said assembly being manipulated until the valve stem 13 passes through the hole 12. Thereafter, the section 3 is unfolded, while leaving the section 5 in its folded position.

Nextly, the two-part rim section assembly 2 is picked up and inserted in the tire in a position with the section 6 disposed with its free end adjacent the free end of the unfolded section 3. See Fig. 1.

As the section 6 is brought into end to end abutment with the section 3 a curved tongue 15, attached to and projecting from the related end section 6 on the back side thereof, passes in locking relation beneath a cross rod 16 secured in connection with, and spanning between, a pair of ears 17 fixed on the back side of the adjacent end of the section 3 (see Fig. 3). This provides in effect a releasable hook connection between the sections 3 and 6 when said section 6 is brought to backing position against the inside curing bag 8.

Figure 2:
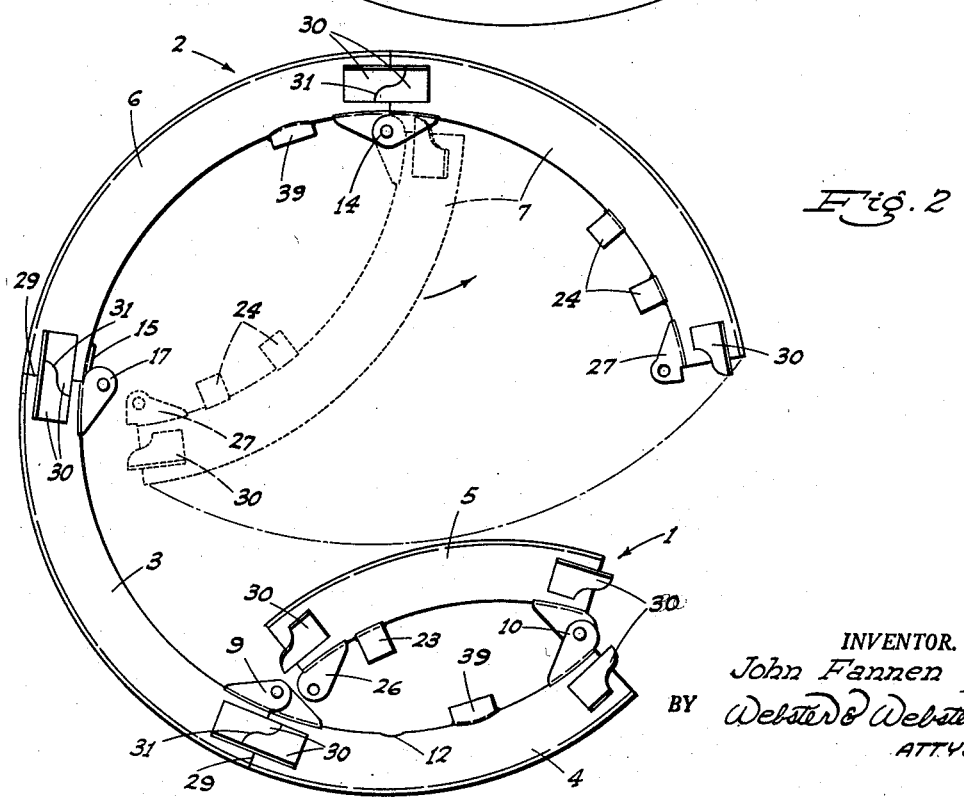
Fig. 2 is a similar view, but shows the two-part rim section assembly as unfolded and connected at one end to the adjacent end of the three-part rim section assembly; the inside curing bag being omitted in this view.

After the section 6 is so positioned the section 7 is unfolded in the direction indicated by the arrow in Fig. 2, and until said section 7 assumes its position in backing relation to the inside curing bag 8. Thereafter, the section 5 is unfolded until its free end is adjacent the free end of the section 7, slightly lapping the latter because of the fact that the unfolded rim must be expanded slightly to permit of the adjacent ends of the sections 5 and 7 to be brought into abutment.

This is accomplished by a leverage type, rim expanding tool, indicated generally at 18, and which tool includes pivotally connected, intersecting lever arms 19 and 20 having outer end tips 21 and 22 which engage in sockets 23 and 24 on the back side of said sections 5 and 7. By manipulation of the tool 18 the sections 5 and 7 are forced in opposite directions and until they snap into end to end engagement or abutment, as shown in Fig. 3.

A pair of sockets 24 are provided in circumferentially spaced relation, and such sockets are used selectively, and dependent on the extent of leverage required.

When the sections 5 and 7 are brought into end to end abutment, as above, the tool 18 is removed and said sections are secured in such position by a cross pin 25 inserted through pairs of lapping ears fixed to the back side of the adjacent end portions of said sections 5 and 7; the pair of ears on the section 5 being indicated at 26, while the pair of ears on the section 7 is indicated at 27.

To aid in the placement or removal of the cross pin 25 it is formed at one end with a right angle finger grip 28.

By following the described manipulative steps, the three-part rim section 1 and the two-part rim section 2 can be readily unfolded and connected within a tire to provide a full-circle inside curing rim.

To preclude the possibility of any lateral shifting of any rim section relative to the next at the line of end to end abutment, and which line is indicated at 29, the rim sections are fitted—at the ends, and on both sides—with flat lugs 30 which project beyond such ends and lap the next section. The lugs 30 of each pair thereof have matching edges whose line of engagement is generally S-shaped, with such line extending generally diagonally and in intersecting relation to the related line of abutment 29. The lugs 30 of each pair are disposed so that they easily come together and abut at the line 31 upon the related rim sections being disposed in unfolded or open position, and thereafter such lugs serve to effectively maintain adjacent rim sections accurately alined against lateral displacement.

After the described rim has been assembled within a tire, and in backing relation to the inside curing bag therein, and which is fully accomplished with the tire held in what is known as a "tire spreader," it is necessary to then transport the tire to the mold. This is sometimes accomplished by an overhead crane or hoist and a lifting chain 32 having a central lifting ring 33 interposed therein; the chain being detachably connected at its ends to the inside curing rim at diametrally opposed points by detachable couplings, indicated generally at 34. As each of such detachable couplings is a duplicate of the other, a description of one will suffice for both.

Each detachable coupling 34 comprises an enlarged circular disc 35 having a rigid eye 36 on one side, and to which eye the adjacent end of the chain 32 is connected. A relatively small-diameter neck 37 projects axially from the opposite side of the disc 35, and at its outer end said neck is formed with a circular head 38 of somewhat larger diameter than said neck 37. The rim, at opposite points—i. e. on the section 4 and section 6—is formed at each such point with a hollow cylindrical socket 39 having an inwardly extending annular shoulder 40 at its outer end, and which shoulder defines a circular entry opening 41 whose diameter is only slightly greater than that of the head 38.

To engage each coupling the disc 35 is grasped and the head 38 is passed through the circular entry opening 41 of the related socket 39, and then said disc 35 is shifted radially in the direction of intended lift, and which causes the annular shoulder 40 to seat into the annular channel 42 which is defined about the neck 37 between the head 38 and said disc 35.

In order to prevent the head 38 from accidentally slipping downwardly—when the chain 32 is slack—to a position in which said head could withdraw from the circular entry opening 41, the neck 37 and head 38 are formed with a central bore 43 in which a spring-pressed detent 44 is disposed. Such detent, as shown, includes a circular metallic ball which projects initially a short distance out of the bore 43. When the head 38 is inserted in the socket 39 and shifted so that the annular shoulder 40 engages in the channel 42, the spring-pressed detent rides the face of the related rim section within the socket 39, thus frictionally holding the coupling in a position against accidental detachment. However, when desired, the coupling can be readily manually detached by merely grasping the disc 35 and shifting it to a position such that the head 38 can escape out of the opening 41. With the foregoing arrangement the lifting chain can be readily applied to, or detached from, the inside curing rim.

When it is desired to remove the described curing rim from a tire, and after the tread vulcanizing operation is complete, the steps previously described are repeated, but in reverse; the tool 18 being used to initially break the section 5 inwardly from the section 7, but only after the cross pin 25 has been removed. Thereafter, the two-part rim section assembly 2 is folded and the tongue 15 withdrawn from the cross rod 16; the assembly 2 then being lifted out of the tire and set aside.

Nextly, the section 5 is folded onto the section 4, followed by folding of the section 3 onto said section 5, whereupon the three-part rim section 1 is likewise lifted out of the tire and set aside.

From the foregoing description it will be readily seen that there has been described such a device as will substantially fulfill the objects of the invention as set forth herein.

While this specification sets forth in detail the present and preferred construction of the device, still in practice such deviations therefrom may be resorted to as do not form a departure from the spirit of the invention, as defined by the appended claim.

Having thus described the invention the following is claimed as new and useful, and upon which Letters Patent are desired:

An inside curing rim comprising a plurality of arcuate rim sections disposed end to end in full-circle arrangement, means hinging certain of said rim sections at adjacent ends to form one initially separate part-circle assembly adapted to fold inwardly, means hinging the remainder of said rim sections at adjacent ends to form a second initially separate part-circle assembly adapted to fold inwardly, said one assembly including sections having initially free outer ends adjacent corresponding initially free outer ends of related sections of the second assembly whereby to provide circumferentially spaced points of separation between said assemblies, and a reelasable connection between said adjacent outer ends of such related sections at each of said points of separation; one of said releasable connections including a tongue fixed on one of the corresponding related sections, said tongue projecting toward the other related section and curving inwardly, transversely spaced ears on said other related section, and a cross rod between said ears; the curved tongue engaging generally hook-like beneath said cross rod, and being adapted to be withdrawn therefrom upon inward swinging motion of said one of the corresponding related sections.

References Cited in the file of this patent

UNITED STATES PATENTS

| | | |
|---|---|---|
| 62,489 | Hopkins | Feb. 26, 1867 |
| 261,629 | Raymond | July 25, 1882 |
| 2,088,130 | Broering | July 27, 1937 |
| 2,152,765 | Kite | Apr. 4, 1939 |
| 2,372,246 | Bacon | Mar. 27, 1945 |
| 2,561,573 | Hovlid et al. | July 24, 1951 |
| 2,682,684 | Kraft | July 6, 1954 |
| 2,700,795 | Kraft | Feb. 1, 1955 |
| 2,724,861 | Cox et al. | Nov. 29, 1955 |